March 27, 1934.  C. M. VAUGHAN  1,952,521
EGG NEST
Filed April 3, 1933
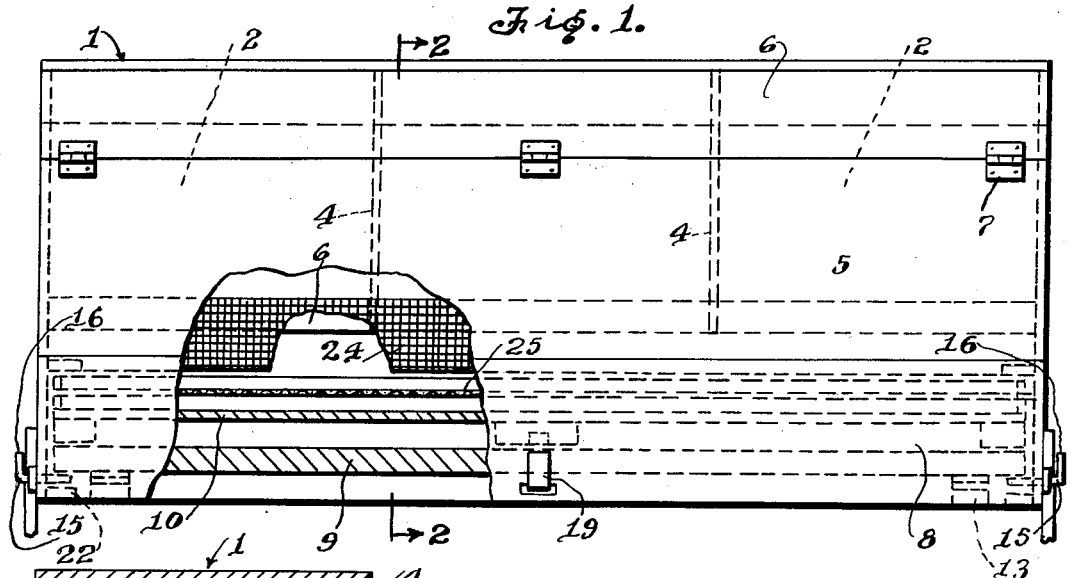
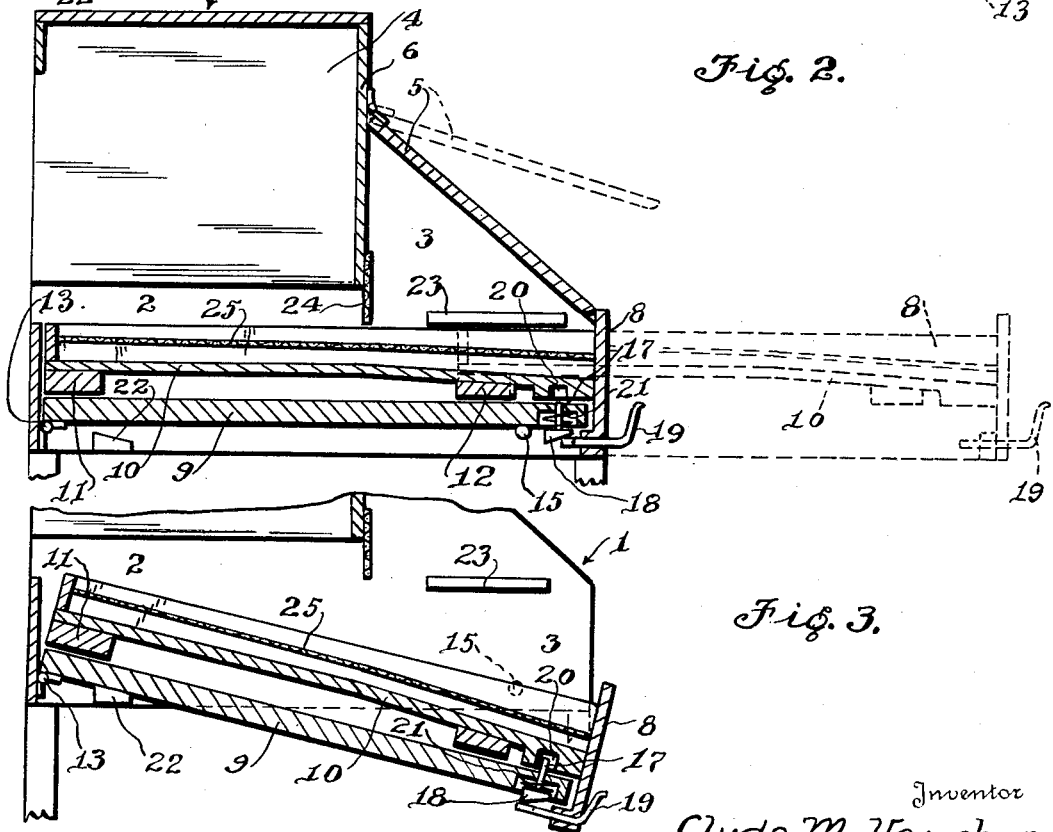
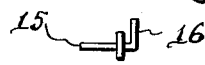
Inventor
Clyde M. Vaughan
By J. Kaplan
Attorney Patented Mar. 27, 1934

1,952,521

UNITED STATES PATENT OFFICE 1,952,521

EGG NEST

Clyde M. Vaughan, Port Orchard, Wash.

Application April 3, 1933, Serial No. 664,246

4 Claims. (Cl. 119—48)

This invention relates to an egg nest and more particularly to a device of this kind for obtaining clean eggs.

The main object of the invention is to provide a sanitary egg nest and arranged so that it can very easily and conveniently be cleaned.

Another object of the invention is to provide an egg nest having a slidable tray to collect the eggs and which can be pulled out to be cleaned.

Another object of the invention is to arrange the tray so that it can swing downwardly for cleaning purposes.

Still another object of the invention is to arrange the tray so that it can both be pulled out and swing downwardly.

In the drawing:

Figure 1 is a front view of the egg nest.

Figure 2 is a section on line 2—2 of Figure 1.

Figure 3 is a similar view as Figure 2 but showing the tray moving downwardly.

Figure 4 is a view of one of the slidable rods.

Referring now to the drawing in detail, numeral 1 designates the outer casing of the hen nest, 2 the series of egg laying compartments and 3 the egg storage compartment. Numeral 4 designates the partitions for dividing the casing into the various hen layng compartments. Three compartments are shown in the drawing but, however, as many more as necessary can be used. The roof 5 of the compartment is sloping and is hinged to the front wall 6 of the casing by the hinges 7.

Arranged in the bottom of the casing is sliding egg tray 8 adapted to slide on a hinged plate 9. The bottom 10 of the egg tray is level in the rear and slightly slopes downwardly at the front. Attached to the underside of the bottom of the tray are two blocks 11 and 12 which form the points of contact with the plate 9 and slide thereon. The said plate is hinged at the rear to the casing by the set of hinges 13. The front end of the plate is normally supported by the slidable rods 15. These slidable rods pass through openings in the sides of the egg tray. As clearly seen in Figure 1, the said rods are provided with handles 16 so they can be manually pushed in and pulled out in order to sustain the front end of the plate 9 or allow it to drop down as indicated in Figure 3. In the center of the front end of the plate 9 is a latch 17 spring pressed downwardly and having an inclined base 18. Numeral 19 designates a sliding handle which is adapted to come in contact with the inclined base. When the handle is pushed inwardly the latch will move up and enter the recess 20 in the bottom of the tray as indicated in Figure 3 and when the handle is pulled outwardly the spring 21 will urge the latch down. When the latch is in a downward position as shown in Figure 2 the tray 8 is free to slide out. When the latch is in an upward position the tray is locked with the plate 9 and cannot slide out but can swing down in unison with the said plate as shown in Figure 3 when the sliding rods 15 are pulled outwardly to release the front end of the plate.

Numeral 22 designates a set of stops to limit the downward movement of the plate. In contact with the top edge of the side of the tray are guides 23 to prevent the tray from tipping down when it is pulled out. Numeral 24 designates a strip of wire mesh attached to the wall 6 and reaching down to the top edge of the tray in order to prevent the chickens from entering the egg chamber 3. Above the floor of the tray is a sheet of wire mesh 25. The chicken enters the laying chamber 2, lays her egg and then it gently rolls on the wire mesh to the egg collecting chamber 3 where the eggs can be collected by lifting up the top 5. To clean the egg tray it can be pulled out as shown in dotted lines in Figure 2 or the tray can be tilted downwardly as indicated in Figure 3.

It will thus be seen that I have provided a sanitary and efficient apparatus for obtaining clean eggs. In actual practice the eggs are 95% clean when taken out from the egg chamber.

I claim:

1. In a device of the class described, a casing comprising an egg laying and egg collecting chamber, a slidable tray at the bottom of said chambers, a hinged plate, said tray resting on said hinged plate, means to latch said tray to said hinged plate, means to support said plate in a horizontal position, and means to allow said tray to tilt downwardly.

2. In a device of the class described, a casing comprising an egg laying and egg collecting chamber, a slidable tray at the bottom of said chambers, a hinged plate underneath said slidable tray, slidable rods for keeping said hinged plate in a horizontal position, and a latch for latching said hinged plate and said slidable tray against relative lateral movement with each other.

3. In a device of the class described, the combination of a casing, of an egg laying chamber and an egg collecting chamber adjacent each other, a partition dividing said chambers, a tray beneath and running the full length and width of said egg laying and egg collecting chambers, the roof of said egg collecting chamber being hinged and adapted to swing open to expose to view the said egg collecting chamber, a plate, said tray being supported on said plate and arranged to slide on said plate to open position, said plate being hinged, and means including said hinge to swing said plate and said tray downwardly.

4. In a device of the class described, the combination of a casing, of an egg laying chamber and egg collecting chamber adjacent each other, a partition dividing said chambers, a tray beneath and running the full length and width of said egg laying and egg collecting chambers, the roof of said egg collecting chamber being hinged and adapted to swing open to expose to view the said egg collecting chamber, a plate, said tray being supported on said plate and arranged to slide on said plate to open position, said plate being hinged, means to keep said plate in a horizontal position, and means including said hinge to swing said plate and tray downwardly.

CLYDE M. VAUGHAN.